United States Patent
Grossner et al.

(10) Patent No.: US 7,865,584 B2
(45) Date of Patent: Jan. 4, 2011

(54) NETWORK SERVICE PERFORMANCE MONITORING APPARATUS AND METHODS

(75) Inventors: Clifford Grossner, Ottawa (CA); Brad James Whitehead, Kingston (CA); Ken Parker, Kanata (CA)

(73) Assignee: Alcatel Lucent, Paris (FR)

( * ) Notice: Subject to any disclaimer, the term of this patent is extended or adjusted under 35 U.S.C. 154(b) by 782 days.

(21) Appl. No.: 11/557,287

(22) Filed: Nov. 7, 2006

(65) Prior Publication Data

US 2007/0294399 A1 Dec. 20, 2007

Related U.S. Application Data

(60) Provisional application No. 60/814,983, filed on Jun. 20, 2006.

(51) Int. Cl.
*G06F 15/173* (2006.01)
(52) U.S. Cl. .................. 709/223; 709/203; 709/217
(58) Field of Classification Search ............... 709/223, 709/224, 203, 217, 219
See application file for complete search history.

(56) References Cited

U.S. PATENT DOCUMENTS

| | | | | |
|---|---|---|---|---|
| 6,597,777 | B1 * | 7/2003 | Ho | 379/133 |
| 7,240,112 | B2 * | 7/2007 | Farhat et al. | 709/224 |
| 7,467,192 | B1 * | 12/2008 | Lemler et al. | 709/223 |
| 7,492,720 | B2 * | 2/2009 | Pruthi et al. | 370/252 |
| 2002/0143494 | A1 | 10/2002 | Conrad | |
| 2003/0120666 | A1 * | 6/2003 | Tacaille et al. | 707/100 |
| 2003/0225876 | A1 * | 12/2003 | Oliver et al. | 709/224 |
| 2004/0088403 | A1 | 5/2004 | Aggarwal | |
| 2005/0187950 | A1 * | 8/2005 | Parker et al. | 707/100 |
| 2007/0124727 | A1 * | 5/2007 | Tennyson et al. | 717/158 |

OTHER PUBLICATIONS

Ranasinghe, D.W., et al., "Inter-operator OSS interface for delivering pan-European ATM VP service", BT Technology Journal, XP-000824592, vol. 17, No. 1, Jan. 1999, pp. 189-207.
Bhoj, P., et al., "SLA management in federated environments", Computer Networks 35 (2001) 5-24, www.elsevier.com/locate/comnet, 2001, pp. 5-24.
"Composite Application Manager for SOA, Version 6.0—Installing and Troubleshooting IBM Web Services Navigator", IBM, 2005, The Web Services Profiling Perspective, pp. 14-16.

* cited by examiner

*Primary Examiner*—Lashonda T Jacobs
(74) *Attorney, Agent, or Firm*—Smart & Biggar

(57) ABSTRACT

Network service performance monitoring apparatus and methods are disclosed. Performance information associated with a network service is collected from multiple service monitoring points. The service monitoring points include at least a service monitoring point in a first communication network and a service monitoring second communication network that is controlled independently of the first communication network. The first communication network could be a network in which a service provider system that provides the network service is located, and the second communication network could be a communication network through which the network service is accessible by a network service consumer. In this case, the collected performance information may be integrated to create an inter-network view of performance of the service. Historical performance information associated with a network service may be used to establish a performance baseline for the service.

18 Claims, 4 Drawing Sheets

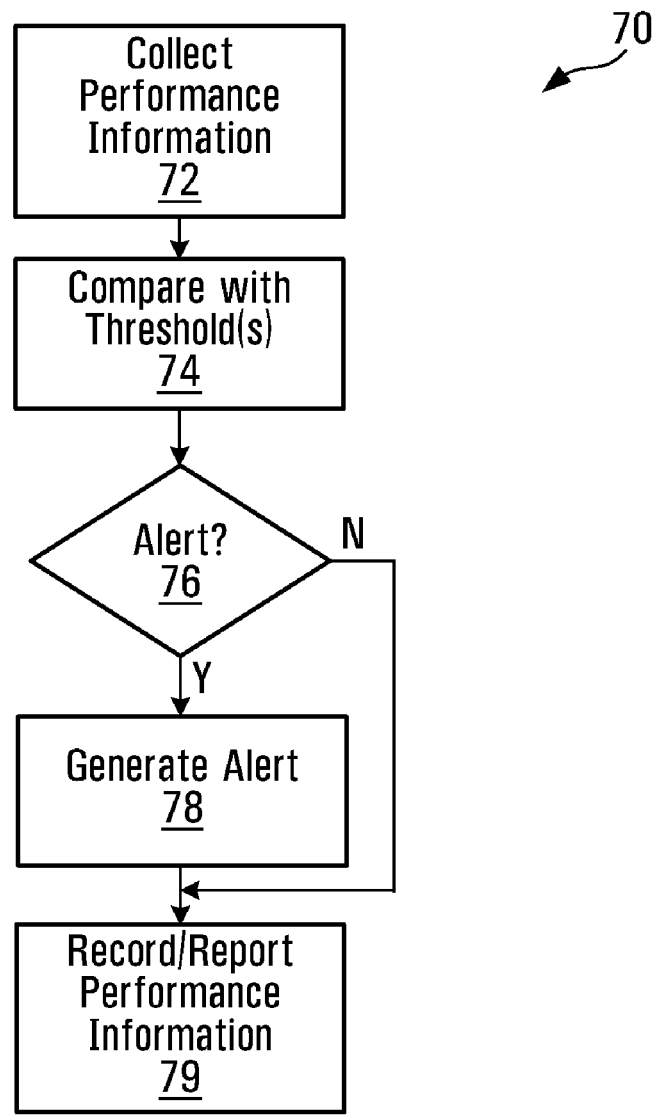

NETWORK SERVICE PERFORMANCE MONITORING APPARATUS AND METHODS

CROSS-REFERENCE TO RELATED APPLICATIONS

The present patent application claims the benefit of U.S. Provisional Patent Application Ser. No. 60/814,983, entitled "NETWORK SERVICE PERFORMANCE MONITORING APPARATUS AND METHODS", and filed on Jun. 20, 2006, the entire contents of which are incorporated herein by reference.

The present patent application is related to each of the following patent applications, the contents of which are entirely incorporated herein by reference:

U.S. Provisional Patent Application Ser. No. 60/815,134, entitled "SECURE DOMAIN INFORMATION PROTECTION APPARATUS AND METHODS", and filed on Jun. 20, 2006, and U.S. Utility patent application Ser. No. 11/467,387, filed on Aug. 25, 2006 and claiming the benefit thereof;

U.S. Provisional Patent Application Ser. No. 60/815,099, entitled "COMMUNICATION NETWORK APPLICATION ACTIVITY MONITORING AND CONTROL", and filed on Jun. 20, 2006, and U.S. Utility patent application Ser. No. 11/460,789, filed on Jul. 28, 2006 and claiming the benefit thereof;

U.S. Provisional Patent Application Ser. No. 60/814,963, entitled "SECURE COMMUNICATION NETWORK USER MOBILITY APPARATUS AND METHODS", and filed on Jun. 20, 2006, and U.S. Utility patent application Ser. No. 11/465,172, filed on Aug. 17, 2006 and claiming the benefit thereof.

FIELD OF THE INVENTION

This invention relates generally to communications and, in particular, to monitoring performance of network services.

BACKGROUND

Services for which information is distributed through a communication network may be referred to as network services. "Web services" are an example of network services, and represent the next generation of technology being used for automatically exchanging information between different applications over the public Internet and many private networks. Web services provide a framework for building web-based distributed applications, and can provide efficient and effective automated machine-to-machine communications.

From a technology point of view, web services are network accessible functions that can be accessed using standard Internet protocols such as HyperText Transfer Protocol (HTTP), eXtensible Markup Language (XML), Simple Object Access Protocol (SOAP), etc., over standard interfaces.

The real power of web services technology is in its simplicity. The core technology only addresses the common language and communication issues and does not directly address the onerous task of application integration. Web services can be viewed as a sophisticated machine-to-machine Remote Procedure Call (RPC) technology for interconnecting multiple heterogeneous untrusted systems. Web services take the best of many new technologies by utilizing XML technology for data conversion/transparency and Internet standards such as HTTP and Simple Mail Transfer Protocol (SMTP) for message transport.

One of the primary drivers behind the development and standardization of web services is the ability to facilitate seamless machine-to-machine application-level communications by providing a loose coupling between disparate applications. Such a loose coupling of applications allows applications on different servers to interoperate without requiring a static, inflexible interface between them. Applications using very different technologies can interoperate using standard web services protocols.

A significant problem faced by network and application administrators in respect of network services, or more generally network applications by which services are exposed to users, is the ability to monitor service availability and performance, based on performance baselines or other metrics, for services provided within an organization and across organizational boundaries. Good corporate governance dictates that proper monitoring and control points be in place for all business activities.

Individual software applications and services may provide control and reporting of performance of a particular application at the service provider, but they do not have the capability to provide a consolidated end-to-end view of service performance at the service provider and the service consumer or any other points along a service transaction path. Distributed application and service management products similarly only reflect service performance at a service provider, and not at other strategic network monitoring points. These types of application provider- or server-based monitoring approaches are also unable to monitor service performance between independently controlled networks that are in different administrative realms.

Network nodes that process service access messages, such as existing firewalls and gateways, may provide a log of all Internet Protocol (IP) messages that have been processed. They do not, however, supply the ability to track service performance for a particular service and provide a consolidated record of service performance across different networks or administrative realms.

Thus, there remains a need for improved service performance monitoring schemes.

SUMMARY OF THE INVENTION

Embodiments of the invention may enable such functions as monitoring network service availability, monitoring network service performance, and establishing performance baselines to ensure that a published network service performs within and conforms to corporate standards as well as external Service Level Agreements (SLAs).

According to one aspect of the invention, a machine-implemented method is provided. In one embodiment, the method includes collecting, from a plurality of service monitoring points, performance information associated with a network service, and maintaining a record of performance of the network service based on the performance information collected at the plurality of service monitoring points. The plurality of service monitoring points includes a service monitoring point in a first communication network and a service monitoring point in a second communication network that is controlled independently of the first communication network.

The network service may include respective offerings of a type of network service by respective service provider systems in the first communication network and the second communication network.

Where the network service is provided by a service provider system in the first communication network and the second communication network is an external independently controlled communication network through which the network service is accessible by a network service consumer, the record may be a record of inter-network performance of the network service.

The method may also include designating a primary intra-network collection point in each of the first communication network and the second communication network to collect performance information from multiple service monitoring points in each network. In this case, collecting may involve collecting information from the designated primary intra-network collection points.

In some embodiments, the method includes comparing the record of performance to a performance requirement of the network service, and generating an alert responsive to a difference between the record of performance and the performance requirement.

The performance requirement may reflect one or more of an SLA requirement, an active baseline requirement established based on previously collected performance information associated with the network service, and an internal performance requirement established in the first communication network.

Collecting may involve collecting information based on transaction data associated with the network service.

The network service is a web service in some embodiments.

Such a method may be embodied, for example, in instructions stored on a machine-readable medium.

An apparatus is also provided, and includes a performance information collection module and a performance information processing module. The performance information collection module is operable to collect, from a plurality of service monitoring points, performance information associated with a network service. The plurality of service monitoring points includes a service monitoring point in a first communication network and a service monitoring point in a second communication network that is controlled independently of the first communication network. The performance information processing module is operatively coupled to the performance information collection module and is operable to maintain a record of performance of the network service based on the performance information collected at the plurality of service monitoring points.

The network service may include respective offerings of a type of network service by respective service provider systems in the first communication network and the second communication network.

Where the network service is provided by a service provider system in the first communication network and the second communication network is an external independently controlled communication network through which the network service is accessible by a network service consumer, the record may be a record of inter-network performance of the network service.

The performance information collection module may be a designated primary intra-network collection point in one of the first communication network and the second communication network, and be operable to collect performance information from multiple service monitoring points in the one of the communication networks, and to collect performance information from a designated primary intra-network collection point in the other of the communication networks.

In some embodiments, the performance information processor includes an alert generator that is operable to compare the record of performance to a performance requirement of the network service, and to generate an alert responsive to a difference between the record of performance and the performance requirement.

As noted above, the performance requirement may reflect one or more of an SLA requirement, an active baseline requirement established based on previously collected performance information associated with the network service, and an internal performance requirement established in the communication network.

The performance information processor may include a baseline generator for generating the active baseline requirement based on previously collected performance information associated with the network service.

The performance information collection module may collect performance information based on transaction data associated with the network service. If the transaction data includes data related to web service request and reply messages, the data may include one or more of: message size, message type, time received, internal processing time, and time sent.

A web services node may incorporate such an apparatus, and in some embodiments is implemented at one or more of: the first communication network, the second communication network, and a central aggregation point.

According to another aspect of the invention, an apparatus includes a performance information collection module for collecting performance information associated with a network service at a service monitoring point, the service monitoring point being a service monitoring point in one of a first communication network and a second communication network that is controlled independently of the first communication network, and an interface enabling the collected performance information to be forwarded to the other of the first communication network and the second communication network.

There is also provided a machine-readable medium storing a data structure. The data structure includes an identifier of a network service, and performance information associated with the network service. The performance information includes performance information collected at a plurality of service monitoring points. The plurality of service monitoring points includes a service monitoring point in a first communication network and a service monitoring point in a second communication network that is controlled independently of the first communication network.

The data structure may also include information indicative of a condition under which a performance alert based on the performance information is to be generated.

A further aspect of the invention relates to an apparatus that includes a memory for storing historical performance information associated with a network service, and an alert generator operatively coupled to the memory and operable to determine, based on the historical performance information, whether to generate an alert responsive to subsequently collected performance information associated with the service.

The apparatus may also include a baseline generator operatively coupled to the memory and to the alert generator and operable to establish a performance baseline based on the historical performance information. In this case, the alert generator is operable to determine whether to generate an alert by comparing the subsequently collected performance information to the performance baseline established by the baseline generator.

A Graphical User Interface (GUI) is also provided, and includes respective representations of a plurality of service monitoring points, the plurality of service monitoring points including a service monitoring point in a first communication network and a service monitoring point in a second communication network that is controlled independently of the first communication network, and respective representations of performance information, associated with a network service, that has been collected at the plurality of service monitoring points.

A further aspect of the invention provides a machine-implemented method that involves collecting performance information associated with a network service at a service monitoring point, the service monitoring point comprising a service monitoring point in one of a first communication network and a second communication network that is controlled independently of the first communication network, and forwarding the collected performance information to the other of the first communication network and the second communication network.

According to yet another aspect of the invention, a machine-implemented method involves obtaining historical performance information associated with a network service, and determining, based on the historical performance information, whether to generate an alert responsive to subsequently collected performance information associated with the network service.

The method may also involve establishing a performance baseline based on the historical performance information, in which case the operation of determining may involve comparing the subsequently collected performance information to the performance baseline.

Such methods may be embodied, for example, in instructions stored on a machine-readable medium.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 3 is a flow diagram of a method according to another embodiment of the invention.

FIG. 4 is a block diagram of a data structure according to another embodiment of the invention.

DETAILED DESCRIPTION OF PREFERRED EMBODIMENTS

Figure 1:
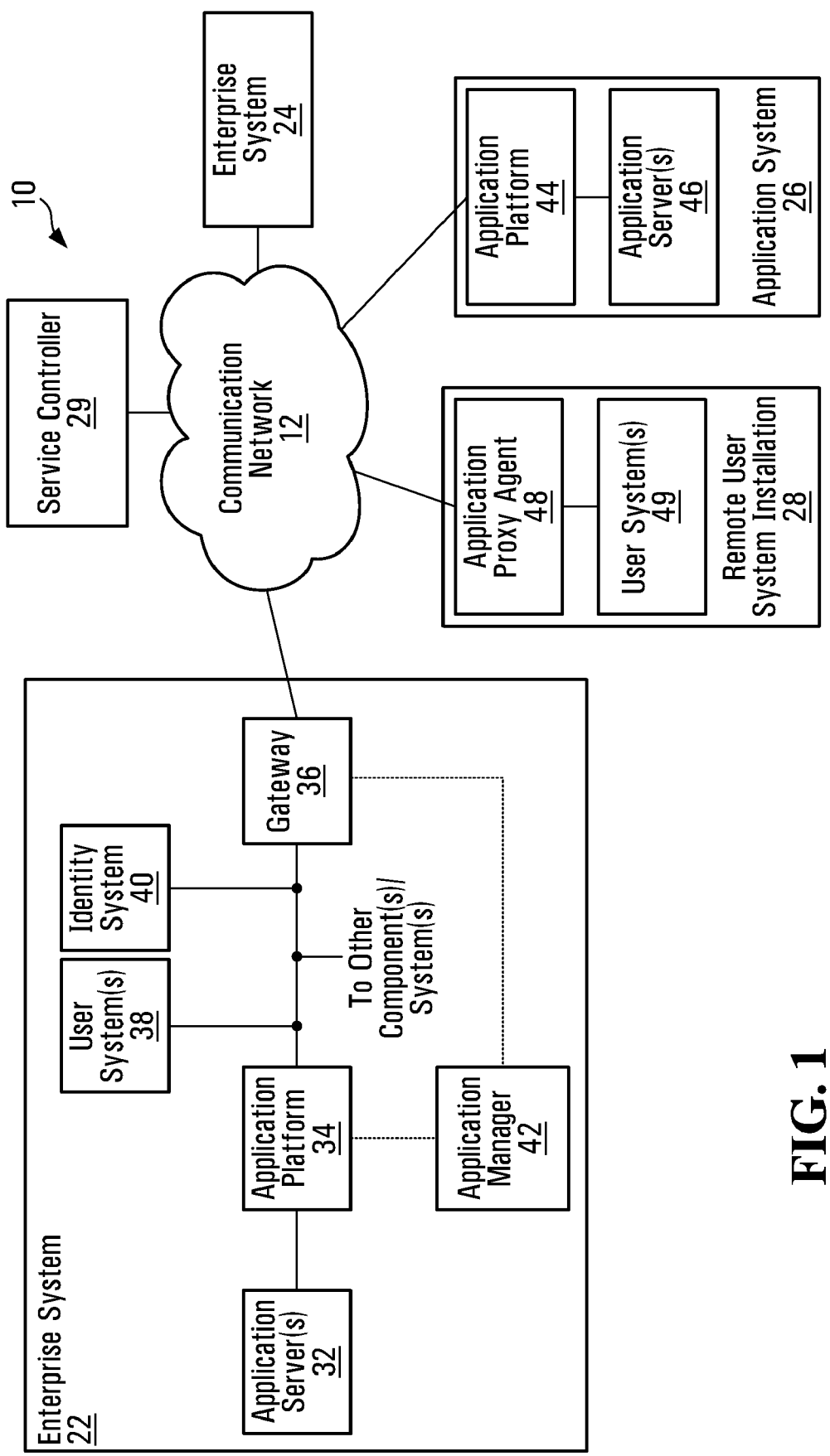
FIG. 1 is a block diagram of a communication system.

FIG. 1 is a block diagram of a communication system in which embodiments of the invention may be implemented. The communication system 10 includes a communication network 12, to which enterprise systems 22, 24, an application system 26, a remote user system installation 28, and a service controller 29 are operatively coupled through respective communication links.

The enterprise system 22 includes one or more application servers 32, an application platform 34 operatively coupled to the application server(s), a gateway 36 operatively coupled to the application platform and to the communication network 12, one or more user systems 38 operatively coupled to the application platform and to the gateway, an identity system 40 operatively coupled to the application platform, to the user system(s), and to the gateway, and an application manager 42 operatively coupled to the application platform and to the gateway. Other components or systems, such as firewalls located on either side of the gateway 36 to provide a DeMilitarized Zone (DMZ), may also be deployed. The enterprise system 24 may have a similar structure.

In the application system 26, an application platform 44 is operatively coupled to the communication network 12 and to one or more application servers 46. The remote user system installation 28 includes an application proxy agent 48 operatively coupled to one or more user systems 49.

Although many enterprise systems, application systems, remote user system installations, service controllers, and possibly other types of systems may be provided in a communication system, only illustrative examples of certain types of systems have been shown in FIG. 1 to avoid overly complicating the drawing. Internal details of the communication network 12, such as border or access equipment and core switching/routing components, and the enterprise system 24 have also been omitted from FIG. 1 for similar reasons. The type, structure, and operation of the communication network 12 may vary between deployments of embodiments of the invention. Other embodiments of the invention may also include enterprise systems, application systems, and/or remote user system installations that include fewer, further, or different components, with similar or different interconnections, than shown.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

Those skilled in the art to which the present invention pertains will be familiar with many different types of communication networks, including overlay networks such as application layer networks and more traditional infrastructures. The present invention is not limited to any particular type of communication network. In one embodiment, the communication network 12 is the Internet or some other public network.

Many examples of access technologies through which the systems 22, 24, 26, 28, 29 access the communication network 12 will also be familiar to those skilled in the art, and accordingly have not been separately shown in FIG. 1.

Considering first the enterprise system 22, an application server 32 supports applications that may provide functions, illustratively services, for use by at least the local user system(s) 38. Where multiple application servers 32 are deployed, each server supports a respective set of functions or services, which may or may not overlap the services supported by other servers.

In some embodiments, these functions are also made available for use by external user systems, such as user systems in the enterprise system 24, where owners or operators of the enterprise systems 22, 24 have an agreement for inter-system access by their users, and/or the user system(s) 49 at the remote user system installation 28. The service controller 29 may be involved in managing the usage of services, which are provided by service provider systems such as the application server(s) 32 within one administrative domain, by external network service consumers such as the user system(s) 49.

References herein to use of applications are intended to convey the notion of any such function. Generally, an application server 32 executes a software application to provide these functions. A service, such as a web service, is an example of an application function that is exposed to user systems, in the context of the present disclosure. Any references to applications, functions, and services should be interpreted accordingly.

An application server 32 may include such components as one or more processors, one or more memory devices, and an interface for exchanging application transaction information, such as service request messages and corresponding responses, with user systems. Memory devices in an application server 32 may be used to store operating system software, application software, etc., for use by the application server processor(s). Enterprise systems such as 22 are often implemented as a network, in which case a network interface enables the application server(s) 32 to communicate with the user system(s) 38 and possibly other components of the enterprise system. In another possible implementation, an application server 32 includes separate interfaces for communicating with different enterprise system components.

A user system 38 may similarly include one or more processors, one or more memory devices, and some sort of interface(s) for communicating with the application server(s) 32, and possibly other components of the enterprise system 22. Operating system software, client software for interacting with the application server(s) 32, and/or other types of information may be stored in user system memory devices.

Those skilled in the art will be familiar with many different types of systems that provide and/or use network applications. Embodiments of the present invention relate primarily to monitoring the performance of network applications, as opposed to how these applications are actually supported, and accordingly the application server(s) 32, the user system(s) 38, and their operation are described only briefly herein to the extent necessary to illustrate aspects of the invention.

The identity system 40 represents another component that is commonly provided in enterprise systems such as corporate networks and will be familiar to those skilled in the art. Access to services or other functions supported by the application server(s) 32 in many cases must be restricted to a particular set of users. The identity system 40, which may authenticate users and/or user systems through interaction with a Lightweight Directory Access Protocol (LDAP) directory or other type of user database, for example, supplies a digital identity that may be used for authorizing or denying access to network services.

In terms of structure, the application platform 34 includes application server interfaces that are compatible with the user system interfaces, illustratively Application Programming Interfaces (APIs), of the application server(s) 32, one or more interfaces compatible with the application server interface(s) of the user system(s) 38, and components for processing messages or other information received and/or transmitted through these interfaces. As described in further detail below, external user systems may be able to access the application server(s) 32 through the gateway 36, in which case the user system interface(s) of the application platform 34 may also enable the application platform to communicate with the gateway 36. However, in some embodiments, a separate gateway interface may be provided for this purpose.

The gateway 36 would also include one or more internal interfaces compatible with interfaces of other components of the enterprise system 22, one or more external interfaces for enabling communication signals to be transmitted and/or received through the communication network 12, and intermediate components for processing signals received and/or transmitted through the interfaces.

The application manager 42 represents a control or monitoring element that might not itself perform real-time processing of information as it is transferred between the application server(s) 32 and the local user system(s) 38 or external user systems. The application manager 42 may communicate with the application platform 34 and the gateway 36 through compatible interfaces, to perform such functions as configuring the application platform and/or the gateway, illustratively by downloading policies to the platform and/or the gateway for enforcement.

Figure 2:
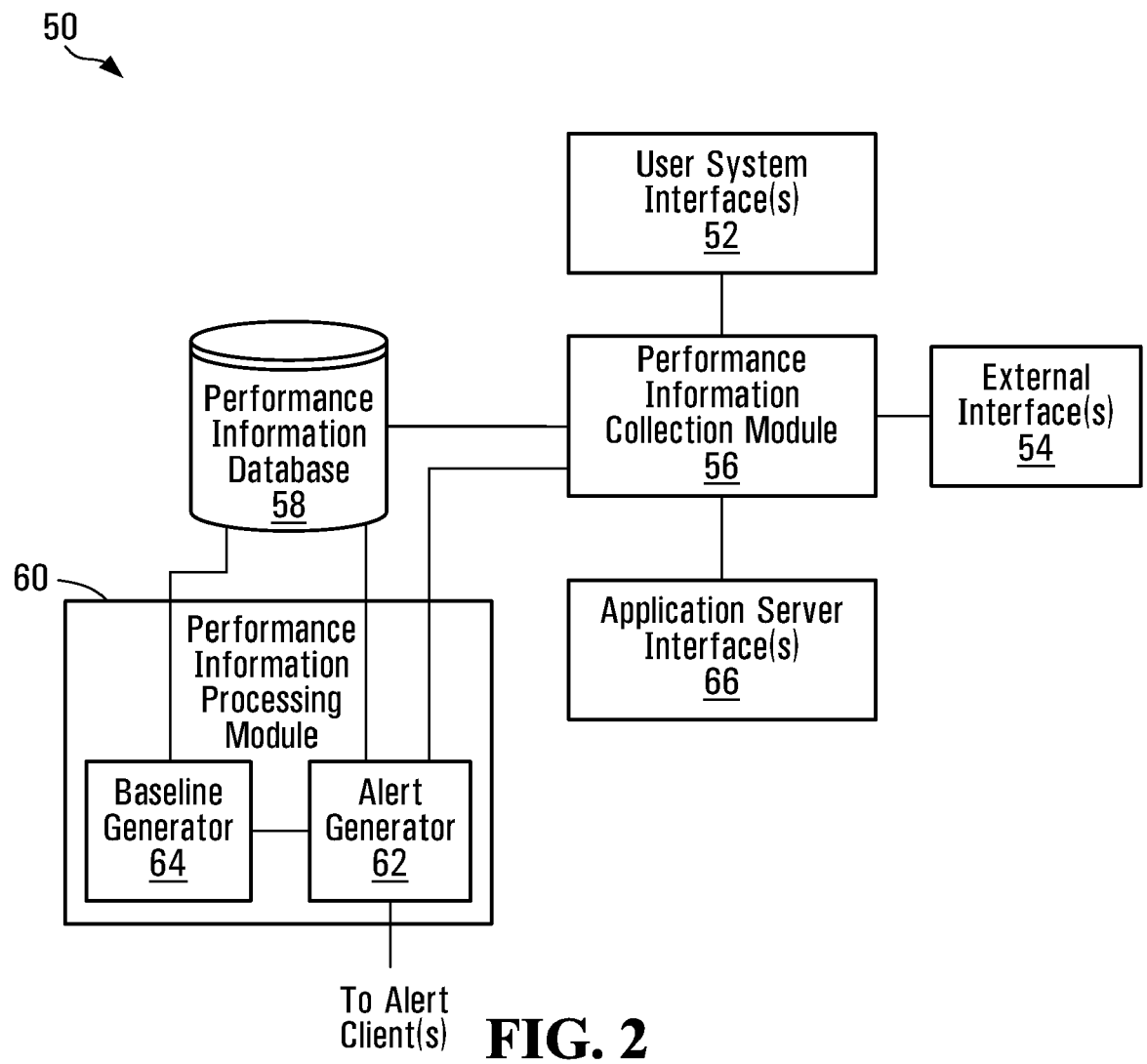
FIG. 2 is a block diagram of an apparatus according to an embodiment of the invention.

The internal components of the application platform 34, the gateway 36, and the application manager 42 may be implemented in hardware, software, firmware, or some combination thereof. An apparatus as described below with reference to FIG. 2 provides an illustrative example of a subsystem that may be provided in the application platform 34 or the gateway 36.

In a traditional deployment of a so-called Service Oriented Architecture (SOA) for an enterprise network, SOA components are individually deployed and integrated on each application server. Publishing a service for use on a network, within the enterprise system 22 for instance, would require a service registry for discovery and management of service offerings. Although web service standards address the need to restrict service access to authorized users, a web services policy server would be needed to store and provide this information. Enforcing these policies can also be a challenge, in that software vendors may require substantial changes to applications and servers in order to adapt to enterprise systems.

All of this can represent a significant project for an enterprise, and may well have a relatively long implementation cycle. In addition, the skill set required to implement such a project is highly specialized, which might make an SOA implementation not economically feasible.

When extending web services or other types of applications to partners, between the enterprise systems 22, 24, for example, even more challenges exist for an SOA infrastructure deployed on application servers. For instance, applications deployed at partner sites might use diverse security mechanisms that cannot share user identity information freely, requiring translation of security tokens for users. Placing the burden of security token translation, or other security functions, on each application server tends to be costly and inefficient.

Data privacy requirements are also very difficult or even impossible to enforce at each application server since application servers themselves might not be aware of whether a user system, or more generally a consumer of its service, is external to its enterprise system.

XML-specific denial of service (XDOS) attacks, and possibly other threats, may be particularly problematic in application server-based SOA implementations. Web services, for example, are open to XDoS attacks, which cannot be effectively dealt with on application servers.

The migration of server-based SOA to a web services model to achieve application interoperability via loosely coupling applications necessitates the need for additional messaging, illustratively in the form of SOAP headers and XML messages, as well as additional processing requirements for managing these messages. This additional overhead consumes network bandwidth and can result in significant new requirements for application server hardware.

An alternate model for deployment of an SOA infrastructure is to integrate the SOA components into enterprise network elements, as shown in FIG. 1. The application platform 34, the gateway 36, and the application manager 42 represent SOA components in the enterprise system 22.

Deploying the SOA infrastructure separately from the application server(s) 32 may provide several benefits: the SOA infrastructure is then application agnostic, applications require minimal modification, the SOA infrastructure is an end-to-end integrated solution, application server processing overhead is minimized, and network bandwidth can be optimized.

With an enterprise system-/network-based SOA deployment, any message translations required for applications to interoperate can be performed according to policies set within the enterprise system, not by the applications themselves. This allows translations to be defined independently of applications, removing the reliance on application vendor implementations.

The business logic required to adapt message format and content is thus provided by the enterprise, not by the application, minimizing application modification. Web services messages, for example, can be adapted within an enterprise network to achieve application interoperability. As new interoperability requirements arise, perhaps due to merger, acquisition, or the need to integrate with a new partner, no application modification is required. New policies for message translation can instead be defined to provide for the new interoperability.

An SOA infrastructure deployed as an integrated enterprise network solution can provide a single monitoring, control, and consolidated reporting point, illustratively the application manager 42. This can be important to enable proper corporate governance, continuous corporate improvement, and the ability to demonstrate compliance with regulations concerning data privacy and network security, for instance.

Application server processing requirements for application interoperability can be significantly reduced for two reasons: application server offload and a reduced number of required translations. Translations can be done once, at the application platform 34, for example, and then forwarded onto multiple destinations rather than each application performing its own translation.

The network bandwidth consumed by additional message traffic can be reduced by routing packets to the application server(s) 32 based upon inspecting the message SOAP headers, XML tags, or other message content. Routing can be sensitive to application contexts rather than based on static IP addresses, for example.

If application server functions are to be extended to partner enterprise systems, an SOA infrastructure deployed as enterprise network infrastructure may provide many further advantages. Translation of security tokens can be done once at the demarcation point between the partners' networks, illustratively at the gateway 36 for external accesses to the application server(s) 32, providing a single enforcement point for security policy. Data privacy can also be enforced at the point where data leaves a security domain, again at the gateway 36, for example. This drives efficiencies and reduces costs. In addition, denial of service attacks targeted at corporate web services can be defended at the gateway 36, the enterprise network edge, which is perhaps the most secure place to deal with this issue.

The application platform 34 provides an SOA infrastructure for integrating applications that traditionally have run as stand-alone applications, and may enable such capabilities as controlling and monitoring all activity initiated by a validated user to thereby allow generation of a consolidated audit trail, translation for message and document formats, managing the life cycle for applications including the staged rollout of web services and rollback to previous versions in the event of unexpected behavior for instance, and monitoring application/service performance to ensure that applications/services meet internal corporate requirements.

This listing of example functions of the application platform 34, like other functional examples noted herein, is by no means restrictive or exhaustive. Many functions may be implemented independently, every embodiment need not necessarily provide all functions, and other functions may also be or become apparent to those skilled in the art.

Benefits of the application platform 34 may include reduced application integration cost through minimum change to existing applications, as noted above, ensuring that access to corporate applications complies with Government regulations, a central monitoring and control point for employee access to web services, and continuous corporate improvement through consolidated reporting.

The gateway 36 effectively extends an intranet SOA provided by the enterprise system 22, through the communication network 12, into an extranet, allowing seamless integration with customers and partners without compromising security or privacy. Functions of the gateway 36 may include, possibly among others, any or all of extending applications to a partner extranet and branch locations, providing seamless mobility for partner access to applications, ensuring partner access to corporate applications complies with Government regulations, and maintaining privacy of corporate identities without compromising traceability.

In providing mobile access to the application server(s) 32 from any partner sites associated with the enterprise system 22, the gateway 36 may allow the secure identification of partner institutions and acceptance of identities between different security domains. Application message and data translations, for user systems associated with external partner sites, may also be provided by the gateway 36, while ensuring that all data remains private as per corporate policy. A consolidated audit trail of all application access may be collected and provided to an external partner enterprise system by the gateway 36, to demonstrate conformance with regulations for instance.

The application manager 42 provides a central point for monitoring and control of the application platform 34, the gateway 36, and any other platforms and gateways (not shown) in the enterprise system 22. Globally consistent policies for all applications, so as to ensure improved corporate governance and/or compliance with Government regulations, can also be established in some embodiments through the application manager 42 and distributed to the application platform 34 and to the gateway 36 for enforcement. The central application manager 42 may also provide for globally consistent application change management.

As noted above, the enterprise system 24 may be substantially similar to the enterprise system 22.

The enterprise system 22 includes both application server(s) 32 that support applications and one or more user system(s) 38 that may use those applications. However, it should be appreciated that application servers and user systems need not necessarily be co-located. The application system 26, for example, includes one or more application servers 46, but no local user systems. Although only an application platform 44 is shown in the application system 26, some implementations of an application system might also include a gateway. Whereas the application system 26 as shown might be suitable, for example, for a remote data center that is associated with a primary data center as the enterprise system 22, a stand-alone or "unaffiliated" application system that hosts applications for use by external user systems might also include a gateway for handling authentication of the external users for instance.

The application platform 44 in the application system 26 may interact with the application manager 42 of the enterprise system 22, or more generally the application manager of an affiliated enterprise system. In the case of a stand-alone application system, a local application manager may be provided. In some implementations, the external service controller 29 interacts with SOA infrastructure components in multiple different domains. For example, the external service controller 29 is operatively coupled to the communication network 12 and might configure the gateway 36 and a gateway in the enterprise system 24 to collect and exchange performance statistics.

A user-only deployment is shown in FIG. 1 as the remote user system installation 28. The application proxy agent 48 allows the user system(s) 49 at a partner or branch location, for example, to use applications provided by remotely located application servers. In one embodiment, the application proxy agent 48 is a scaled-down version of the gateway 36. The application proxy agent 48, like the gateway 36, might maintain privacy of corporate identities during authentication of the user system(s) 49 with the enterprise system 22 without compromising traceability, and support secure communications through the communication network 12 using tunnelling techniques, for example, but need not necessarily be able to authenticate external users since the remote user system installation 28 does not host applications that could be used by external user systems.

The external service controller 29 provides for external management of the sharing of network services between the systems 22, 24, 26, 28, but need not itself include or operate in conjunction with local service provider systems or service consumer systems. A service controller such as 29 might therefore include a service registry system and a network interface through which network service information and service discovery information may be exchanged with the systems 22, 24, 26, 28. The external service controller 29 may also include components for collecting and/or processing service performance information.

In operation, a user system 38 that wishes to make use of an application provided by an application server 32 is first authenticated by the identity system 40. Those skilled in the art will be familiar with many security schemes that may be used for this purpose, such as username/password authentication. Where remote access to an application server 32 is supported, user authentication may be handled by the gateway 36, possibly through interactions with an external identity system. The gateway 36 may also be involved in authentication when a user system that is associated with a partner enterprise system or site is locally connected to the enterprise system 22 and wishes to access an application server 32.

When a user has been authenticated, messages or other forms of information may be exchanged between a user system and the application server(s) 32. A user may be allowed to access multiple applications after a single successful authentication.

As noted above, improved techniques for monitoring performance of network services are needed. For example, currently available products do not enable monitoring of network service performance in multiple independently controlled networks.

In addition, there are no available products that allow service performance monitoring or automatic establishment of performance baselines at various network nodes to ensure conformance to Service Level Agreements (SLAs) by providing a consolidated record of service performance, with alerts or alarms when performance is not within SLA requirements.

Currently available products also do not allow network and application administrators to monitor and baseline service performance by collecting service transaction data or other service performance information at multiple network sensor or collection points or to provide a consolidated record of end-to-end web service performance that transcends organizational boundaries.

These shortcomings leave administrators with no clear per-service record of the actual performance, availability, and baseline delivered to service consumers, and in the case of poor performance, no indication of where the performance problem might be occurring, and no ability to raise an alarm, or even confirm whether the problem is within their organization, their service provider, or one of their business partners.

Network resident service performance monitoring as disclosed herein may allow multi-point sensing of performance information such as service transaction data. A real-time per-service end-to-end record of service availability and performance can thereby be provided. In some embodiments, automatic establishment of service performance baselines, within an enterprise and across organizational boundaries, is also possible.

As will become apparent from the following description, embodiments of the invention may be implemented using a series of subsystems, such as the service controller 29, the application platform 34, the gateway 36, the application manager 42, and the application proxy agent 48. These subsystems might be implemented as network nodes that process service messages in real time in order to facilitate application integration and enable rapid and cost effective deployment of SOAs, as noted above.

Potential benefits of network resident service monitoring may include any or all of: providing a tremendous operational cost saving tool for network and application administrators who need to ensure that service performance meets corporate requirements and/or conforms to external SLAs, supporting active monitoring of service availability, and allowing appropriate baseline performance levels, within their organization and across organizational boundaries, to be automatically determined.

FIG. 2 is a block diagram of an apparatus according to an embodiment of the invention. The apparatus 50 includes one or more user system interface(s) 52, one or more external interface(s) 54, a performance information collection module 56 operatively coupled to the user system interface(s), to the external interface(s), to a performance information database 58, and to one or more application server interface(s) 66, and a performance information processing module 60 operatively coupled to the performance information collection module and to the performance information database. The performance information processing module 60 includes a baseline generator 64 operatively coupled to the performance information database 58, and an alert generator 62 operatively coupled to the baseline generator, to the performance information database, and to the performance information collection module.

As noted above with reference to FIG. 1, the contents of the drawings are intended solely for the purposes of illustration. A device in which the apparatus 50 is implemented may include additional components that have not been explicitly shown, for example. These components might take various forms depending on the point at which, or the device(s)/system(s) in which or in conjunction with which, the apparatus 50 is implemented. In general, other embodiments of an apparatus may include further, fewer, or different components than explicitly shown, with similar or different interconnections.

The types of connections through which the components of FIG. 2 are operatively coupled may, to at least some extent, be implementation-dependent. Electronic devices often use various types of physical connectors and wired connections. In the case of cooperating software functions, for example, an operative coupling may be through variables, registers, or commonly accessed areas of a memory, and thus include a logical coupling.

Hardware, software, firmware, or combinations thereof may be used to implement components of the apparatus 50. Processing elements such as microprocessors, microcontrollers, Programmable Logic Devices (PLDs), Field Programmable Gate Arrays (FPGAs), Application Specific Integrated Circuits (ASICs), and other types of "intelligent" integrated circuits may be suitable for this purpose.

The apparatus 50 may interact with other components of a local communication network and a partner network through the interfaces 52, 54, 66. These interfaces may be of the same type or different types, or even be the same interface where the same communication medium is used for information transfers with all other components. However, in many implementations, it is likely that the user system interface(s) 52 will differ from at least the application server interface(s) 66, and that multiple application server interfaces of different types may be provided for different application servers. The external interface(s) 54 may include one or more interfaces of other different types.

A user system interface 52 enables the apparatus 50 to exchange application access information such as web service messages with user systems. Each application server interface 66 similarly allows the apparatus 50 to exchange application access information with a respective set of one or more local application servers.

This type of architecture for the apparatus 50 might be appropriate, for example, when the apparatus is implemented at a gateway for monitoring service performance by monitoring information such as service messages associated with usage of locally hosted applications by external user systems and/or service messages associated with usage of externally hosted applications by local user systems, since a gateway might handle all application access information for an enterprise system.

However, it should be appreciated that other implementations are also possible. In general, the apparatus 50 might be implemented at any service performance monitoring or analysis point, as will become apparent from the following description. For an implementation of the apparatus 50 at the application platform 34 (FIG. 1), for example, the external interface(s) 54 might include an interface that is compatible with the gateway 36 rather than the communication network 12. Thus, the types and numbers of the interfaces 52, 54, 66 might vary depending upon the location of a monitoring point, but monitoring points may perform at least substantially similar functions as disclosed herein regardless of their location.

Through the external interface(s) 54, the apparatus 50 may exchange information with remote application servers and/or user systems. In the system of FIG. 1 for instance, exchanges between the enterprise systems 22, 24 may involve transfer of information through the communication network 12 and appropriate network interfaces at the enterprise systems. Network interfaces compatible with the communication network 12 may be provided at the gateway 36 and a corresponding gateway at the enterprise system 24. According to embodiments of the invention, the gateways in enterprise systems may be responsible for at least collecting, and possibly also processing, service performance statistics and/or other forms of service performance information. Service performance information collection and/or analysis points could also or instead be provided at application platforms 34, 44, the application proxy agent 48, or at other points along a service path between application servers and user systems, depending on the desired "granularity" of service performance monitoring.

For multi-point service performance monitoring, the external interface(s) 54 may also enable the performance information collection module 56 to collect performance information from other performance information collection modules. This may be accomplished by communicating with the other performance information collection modules, or with a central point that collects performance information from multiple collection modules, aggregates that performance information, and distributes the aggregated performance information.

The structure and operation of the interfaces 52, 54, 66 will be dependent to at least some extent on the communication media and protocols used in information transfers. Those skilled in the art will be familiar with many types of interfaces through which application access information may be received and/or transmitted by the apparatus 50. Any of various types of interfaces may similarly be used to transfer collected performance information between processing points. These interfaces may also vary depending on where in an enterprise system or other administrative domain the apparatus 50 is implemented, as noted above.

It should be appreciated, for example, that the apparatus 50 need not itself be actively involved in transferring application access information such as service messages. The performance information collection module 56 at a gateway might passively "listen" for service messages without having any involvement in actually routing such messages into or out of an enterprise network for instance.

The performance information database 58 may be provided in one or more memory devices. Solid state memory devices are common in electronic equipment, and the performance information database 58 may be implemented using one or more memory devices of this type. However, other types of memory devices, including memory devices for use with movable or even removable storage media, may also or instead be used to store the performance information database 58.

Other components of the apparatus 50 may be implemented using hardware, software, and/or firmware. Based on the descriptions of these components provided herein, a person skilled in the art will be enabled to implement service monitoring techniques according to embodiments of the invention in any of various ways.

In operation, the performance information collection module 56 and the performance information processing module 60 may automatically monitor thresholds associated with performance metrics, which may be defined in SLAs for example, and actual service performance. Some embodiments of the invention may support cooperative inter-network performance monitoring (CIPM) between networks that are in different administrative realms or domains and thus are independently controlled. An automatic baselining (AB) function may also or instead be provided. These and other functions may be provided as network resident functions, to create a unique per service end-to-end view of service availability, current performance, and performance baselines that can transcend organizational boundaries.

Network operators can use service performance information, which may be presented in views created by CIPM and/or AB for instance, to enhance conformance to SLAs, to understand internal and external performance profiles, and to automatically isolate bottlenecks within their SOA.

An XML processing device, such as a web service gateway, can implement the techniques disclosed herein to accomplish any or all of the following tasks, possibly among others:
- Monitor performance with respect to SLAs, and/or internal performance requirements;
- Monitor performance with respect to automatically generated performance baselines;
- Automatically generate performance baselines;
- Automatically generate alerts to a system operator when performance degrades.

Service performance monitoring, CIPM, and AB implementations may include several high-level components, such as a service availability monitor, a service performance monitor, an alert generator, and a baseline generator. These components are described in further detail below, and are represented in FIG. 2 as the performance information collection module 56, which may provide service availability monitor and/or performance monitor functions, the alert generator 62, and the baseline generator 64. It should be appreciated that not all of these components need necessarily be provided in every implementation. For example, some embodiments of the invention might support CIPM but not AB.

Regarding service availability, a service might be considered to be available if it generates responses to requests. Although passive monitoring of response messages from services may provide this information in many cases, it is impossible to establish with certainty whether services that have not generated a response message in the recent past are unavailable or simply inactive. Active monitoring could be supported by the performance information collection module 56 in order to determine the status of those services. Service "heartbeat" messages, for example, may be used to provide a mechanism for active monitoring of service availability.

Service performance is another example of a service status statistic that may be collected by the performance information collection module 56. Other measures of a service's operational status may also or instead be monitored in accordance with embodiments of the invention.

For a service that is available, it may be important to determine performance statistics of the service provider and performance statistics at key locations in the service path(s) between the service provider and its consumer(s). Response time may be critical to applications that make use of services to implement mission critical functionality, for example. The performance statistics for a service could be based on either or both of throughput (e.g., number of messages processed, total size of request messages, total size of response messages, etc.) and time (average delay observed for request-response pairs, maximum observed delay, jitter observed in delay, etc.).

CIPM may extend the concept of performance monitoring to the next level by viewing performance information collection as a collaborative process between two or more networks. Collaboration between networks can be mediated and controlled by gateways in enterprise networks, for example.

It may be very difficult for application and network administrators to determine the acceptable range of performance for monitored services. In the absence of hard requirements such as an SLA, it is likely that administrators will set acceptable thresholds for service performance based on observed performance of services over a period of time. Service performance baselining automates this process, and may allow administrators to set the acceptable thresholds for performance based on a number of standard deviations from the mean of a particular performance measure, or other configurable deviation(s).

Configurable settings could be established by an operator or administrator through a user interface (not shown, so as to avoid complicating the drawing), such as a Command Line Interface (CLI), that is operatively coupled to the performance information collection module 56 and/or to the performance information processing module. Where an operator or administrator accesses the apparatus 50 through a user system, a user system interface 52 effectively acts as a configuration interface.

The baseline generator 64 might be configurable to create a performance baseline for any or all of different types of performance information collected by the performance information collection module 56. Baselines could possibly be specified as time-variable or static, for example. Time-variable baselines generated by the baseline generator 64 could be stored, in the performance information database 58 or separately, as a graph representing the value of a performance statistic or other performance information versus time. Baselines could also or instead be created based on other variable values such as total message size. An example of a static baseline would be the maximum acceptable delay between a request-response pair for a network service.

In the apparatus 50, the baseline generator 64 accesses collected performance information from the performance information database 58, generates a baseline, and provides the generated baseline to the alert generator 62. Other implementations may involve a baseline generator receiving performance information directly from the performance information collection module 56, and/or storing generated baselines in the performance information database 58 or in another memory device or area, for access by the alert generator 62.

The alert generator 62 monitors one or more performance metrics such as internal performance requirements, SLA agreements, and/or baselines, any or all of which may be stored in the performance information database 58 or separately. In order to ensure that corporate provided services are conforming with prescribed service requirements, application and network administrators should be provided with the ability to set alert thresholds and conditions that provide a notification if service performance degrades below the required levels. Alert thresholds and conditions may also be specified for externally supplied services, to ensure that such services are in conformance with mutually agreed upon SLAs and/or other requirements, so that notifications can be provided if performance of an externally provided service degrades below the required levels. A configuration interface, such as an interface to the application manager 42 (FIG. 1), could be provided for this purpose. Such an interface might already be provided where the apparatus 50 is deployed at a gateway, for instance. A command line interface (CLI) is one illustrative example of a configuration interface that may be suitable for this purpose.

The alert generator 62 dynamically monitors current performance levels collected by the performance information collection module 56. Alerts may be generated based on the detection of a potentially configurable deviation from one or more of: active baselines, SLAs, and internal performance requirements, for example.

A services network with performance monitoring can be architected in any of several different ways, using two or more network elements in some embodiments. Network resident services elements may include performance information collection agents such as the performance information collection module 56, and performance information processing agents such as the performance information processing module 60. For CIPM, performance information could be collected at distributed services nodes, illustratively gateways, that proxy all services traffic leaving and/or entering an enterprise system. Performance information can be collected for a variety of services and network performance metrics. A list of performance information for which corporations wish to share a global view could be negotiated between the corporations, for example.

Performance information processing can be performed at any of various points in a collaborative system, internally at application platforms, gateways, application managers, and/or application proxy agents, or externally at a central management component such as a service controller that manages services for multiple corporations. In the system 10 of FIG. 1, the service controller 29 could control at least service monitoring functions of the enterprise systems 22, 24, the application system 26, and/or the remote user installation 28. Performance information collected by the performance information collection modules at service monitoring points are shared between CIPM participants in a collaborative scheme.

Two corporations that offer their local services for external use by users of each corporation, illustratively by publishing these services to each other, may be interested in implementing CIPM so as to enhance the degree to which performance of their services can be monitored. Exchanges of performance information between such CIPM participants can potentially be accomplished in any of several ways.

According to one possible exchange approach, performance information is exchanged in a peer-to-peer fashion between corporations. A primary performance information processing point could be designated at each corporation for this purpose, using the application manager 42 (FIG. 1), for example, where a corporation includes multiple service monitoring points. An enterprise network could include multiple gateways, for example, and implement the apparatus 50 at each gateway. The processing points in each corporation share agreed-upon performance information between corporations in a peer-to-peer fashion.

Another possible configuration is to utilize an external service controller to configure gateways or other devices in each corporation's network. In this scenario, performance information is reported to the service controller by each performance information collection module 56. Each performance information collection module 56 might also locally store the performance information it collects. The service controller distributes the collected performance information, or possibly an aggregated or otherwise processed or combined version thereof, among processing points. Standard transfer protocols may be suitable for distribution of performance information from a central collation/aggregation point.

A central processing point may have other advantages as well. For example, when a service monitoring point in a network detects that one of the local services is not available, this could be reported to the central processing point, and each external system through which that service is available could be advised accordingly by the central processing point.

Once each corporation has collected performance information from its internal network and shared performance information from partner corporations, further processing is performed in some embodiments to create an inter-corporation view of service performance.

In one scenario, a gateway processes requests from both clients and application servers, and records performance information for many different metrics. Metrics can be per service, per user, etc., and specified in a monitoring policy or other configuration information.

Suppose an end user initiates a service request in an enterprise system, and that request is sent to and proxied by an enterprise system gateway at which the apparatus 50 is implemented. The performance information collection module 56 may be configured to collect and store in the performance information database 58 any of many types of performance information based on the received request, which may be in the form of a service message. The types of performance information collected might be established by a local administrator based on internal performance goals or requirements or on an agreed upon set of performance information to collect for CIPM, for example. External configuration through a service controller is also contemplated. Examples of collected performance information include message size, message type (request/reply), time received, time sent toward destination, internal processing time, etc.

Performance information might be available from a received message itself or calculated based on the message or operations performed on a message. In the above example of a received request message, message size might be specified in a message header for instance. For an internal processing time statistic, however, the performance information collection module 56 might record the time at which the message was received and the time at which the message was forwarded toward its destination, or calculate the internal processing time using the receive and forward times.

Continuing with the above example, a local user request that is destined for an external application server is forwarded on to an external system through an external interface 54. As noted above, the apparatus 50 need not necessarily be involved in actually routing such requests. Other components of a gateway, for example, might handle these functions.

At the external system, and/or possibly at one or more other intermediate points along a service path, the request is received or otherwise detected by a performance information collection module 56, which also collects performance information. The performance information collected by each service monitoring point covers at least agreed upon CIPM statistics, although any or all service monitoring points may collect additional performance information as well.

The request eventually arrives at the destination application server, is processed, and a reply is sent back to the originating user system. The reply travels through, or is at least detected by, the same service monitoring points, and performance information can be collected for the reply message.

As noted above, service monitoring points may, but need not necessarily, be actively involved in the transfer of requests, replies, or other forms of service access information. A service monitoring point might passively listen for service access information to detect a request and a corresponding response, for example, and then calculate a request/reply time difference as a performance measure.

CIPM involves the distribution and collaborative processing of performance information from two or more service monitoring points, illustratively gateways. After the above request/reply sequence is completed, for example, all service monitoring points have independent performance information that can be integrated to give an inter-corporation view of overall end-to-end service performance.

Performance information aggregation or integration can be performed in various ways. In one embodiment, gateways and application managers collaborate in a peer-to-peer fashion to exchange CIPM performance information between corporations. As noted above, a central service controller could be used to configure gateways and collect performance information. In this case, the gateways, as service monitoring points, send their collected CIPM performance information to the service controller.

The transfer of collected CIPM performance information to a service controller or other central aggregation point could be performed periodically at possibly configurable intervals, at certain times of day, in response to completion of a request/reply sequence, when requested by the central aggregation point or a local administrator, and/or responsive to some other trigger.

Once collected performance information has been shared between CIPM participants, whether directly or through a central aggregation point, the performance information can be further processed in a variety of ways to extract inter-corporation performance data. The performance information collection module 56 may store in the performance information database 58 not only the performance information that it collects itself, but also the performance information collected by other CIPM participants.

Utilizing CIPM, it is possible to extract performance information that would not otherwise be available. For example, by comparing the timestamps of a message sent from a gateway in the enterprise system 24 (FIG. 1) to the time it was received at the gateway 36, it is possible to determine the latency in the communication network 12, provided the gateways have synchronized clocks. Without CIPM, the gateway 36 would not be able to determine if a delayed response was due to network congestion between the enterprise systems 22, 24, or a result of the service's application server being heavily loaded.

This type of processing may also or instead be performed at a service controller or other central processing point. A central performance information aggregation point could thus act as a distribution point, as a processing point that is able to report performance information and results of performance information processing, or as both a distribution point and a processing point.

CIPM performance information can be used to verify conformance to performance metrics such as external SLAs, corporate requirements, and/or performance baselines. The performance information processing module 60 may perform these types of functions by accessing actual performance information stored in the performance information database 58 and metrics against which performance is to be measured or evaluated. The performance metrics may be stored in the performance information database 58 or in one or more separate stores (not shown).

The alert generator 62 compares CIPM performance information to the appropriate performance metric(s), and automatically generates an alert when violation of a conformance threshold is detected. An alert might be generated when delay is above a threshold or exceeds a normal baseline delay by a predetermined amount, for example. Thresholds are configurable in some embodiments, and could be set to be zero-tolerance, a number of standard deviations from the mean, or some other value.

Alerts generated by the alert generator 62 are sent to one or more alert clients, such an application or network operator or administrator.

The performance monitoring described above is referred to as passive monitoring, since no extra request/reply pairs are being generated. If there has been no activity on a service for some time, then active monitoring may be used to determine whether the service is available. Service availability monitoring could be provided as a configurable feature, to allow an administrator to configure the performance information collection module 56 to also actively monitor the availability of one or more services.

Local and/or CIPM performance information can also or instead be used to generate performance baselines. This function is represented in FIG. 2 by the baseline generator 64. Baselines provide administrators with an automatically generated view of "normal" conditions in their services network.

Baselines can be categorized into variable baselines and static baselines. Static baselines might be generated for types of performance information that are expected to remain the same at any time of day, or for any message size, etc. An example of a static statistic is network delay in a low-utilization network, for which the raw network delay should be constant at any time of day. Static baselines can be stored as a single number representing the mean value of a statistic over a number of samples, for example. Samples can be gathered by utilizing random sampling of collected performance information that relates to the same performance metric.

Variable baselines can change with the time of day or other parameter. For example, the number of requests per second may vary with the time of day, and the time required to send a message may vary with the message size. Variable baselines may be stored as a graph, such that the baseline can be compared to performance information at any point.

To calculate a variable baseline, per-service or global performance information might be used. When new local or CIPM performance information is received by the baseline generator 64, a decision may be made as to whether the new performance information should be used in baseline calculations. This decision is based on two criteria in some embodiments. First, performance information must be determined to be a "normal" value, based on the history and existing baseline. Second, the sampling rate is checked. Baselines can be calculated based on sampled performance information. This means that not all performance information is necessarily stored as baseline performance information. Only 1 in every 1000 entries of performance information collected for a performance metric might be included in a baseline calculation, for example.

A baseline can be recalculated using new performance information, perhaps on a once per day basis or responsive to some other, possibly configurable, trigger. Some baselines may have a periodic repetition that would not be apparent to a system operator. For example, requests-per-second performance information may have a peak and trough pattern that is repeating on an 8 hour basis instead of 24 hours. Baseline calculations can use pattern recognition to determine the base period of a type of performance information and create the baseline for that period only.

According to one embodiment, baselines are calculated on a periodic basis, using a sliding averaged window. A baseline for requests-per-second, for instance, could be updated once per day based on the last 7 days of performance information. Once the baseline is updated, it can be stored with other performance metrics in the performance information database 58 or in a separate store, and/or transmitted to the alert generator 62.

The alert generator 62 provides a means to communicate system performance issues to a system operator or other personnel or system(s), shown generally in FIG. 2 as alert clients. The alert generator 62 ties performance requirements, such as baselines, SLAs, and/or internal requirements, and performance monitoring together, into a common framework for detecting alert conditions.

Alerts are generated by monitoring performance information for variations from the baseline, SLA, or other performance requirements. An alert may be generated by the alert generator 62 based on thresholds, when performance information is above or below a configurable threshold, for example. As noted above, thresholds can be configured to be zero-tolerance, to allow a number of standard deviations from the mean, or to define some other alert condition(s).

The alert generator 62 need not necessarily generate an alert based on a single occurrence of collected performance information that is outside an acceptable range for its performance metric. Performance information could be time-averaged, for example, so that small short-time spikes do not trigger an alert.

Alerts can be communicated to one or more alert clients via e-mail, a Simple Network Management Protocol (SNMP) agent, or some other notification method. The alert generator 62 therefore could be operatively coupled to one or more of the interfaces 52, 54, 66 for communicating alerts to alert clients.

Embodiments of the invention have been described above primarily with reference to the communication system 10 of FIG. 1 and the apparatus 50 of FIG. 2. FIG. 3 is a flow diagram of a method according to another embodiment of the invention.

In the method 70, performance information associated with performance of a service is collected at 72. The collected performance information may include local performance information and/or CIPM performance information collected by remote service monitoring points. At 74, the collected performance information is compared with one or more thresholds. These thresholds may be representative of service requirements such as SLAs, internal goals or requirements, and/or baselines.

Based on the comparison(s) made at 74, a determination is made at 76 as to whether an alert should be generated. Examples of alert generation criteria have been noted above. If an alert condition is detected at 76, then an alert is generated at 78 and sent to one or more alert clients. Otherwise, or when the alert is generated, the collected performance information is recorded and/or reported to a service controller or CIPM participants for instance, at 79.

The method 70 is illustrative of one embodiment of the invention. Other embodiments may involve performing fewer, additional, or different operations, and/or performing operations in a different order than shown. For example, alert processing at 74, 76, 78 need not necessarily be performed before collected performance information is recorded and/or reported at 79. In some embodiments, alert processing and performance information recording proceed in parallel, or alert processing is performed after performance information has been reported. Another operation that may be performed in some embodiments is baseline generation. It should also be appreciated that performance information collection and analysis may be an ongoing process, with the method 70 being repeated while service performance monitoring is enabled.

Further variations of the method 70 may be or become apparent to those skilled in the art.

FIG. 4 is a block diagram of a data structure according to another embodiment of the invention. The data structure 80 includes an identifier 82 of a service for which performance monitoring is to be conducted, a threshold or baseline 84, one or more alert criteria 86, and collected performance information 88.

A service might be identified at 82 by a service or application name or address, for example. A threshold or baseline 84 may include a value or series of values, and possibly multi-dimensional values in the case of a variable threshold or baseline. An alert criterion stored at 86 could specify a tolerable variation by which collected performance information may vary from a threshold or baseline, whether an alert is to be raised when collected performance information is above or below its threshold or baseline, and/or other conditions governing alert generation. The performance information field 88 represents performance information that has been collected for the identified service. For a CIPM implementation, a record of performance information might also include an indication of each service monitoring point at which the performance information was collected.

The data structure 80 is intended as an illustrative example of the types of information that may be stored during service performance monitoring. A performance record for a service might include all of the data fields shown in FIG. 4, so as to provide a complete record of performance information collected for that service and the performance thresholds that have been applied to that service. Performance information collected for a service could instead be stored separately. A performance metric data structure might include only an identifier of the metric, threshold/baseline information, and one or more alarm criteria.

Further variations of the data structure 80 might include fewer, additional, or different fields, and/or an arrangement of fields in a similar or different order than shown.

Figure 5:
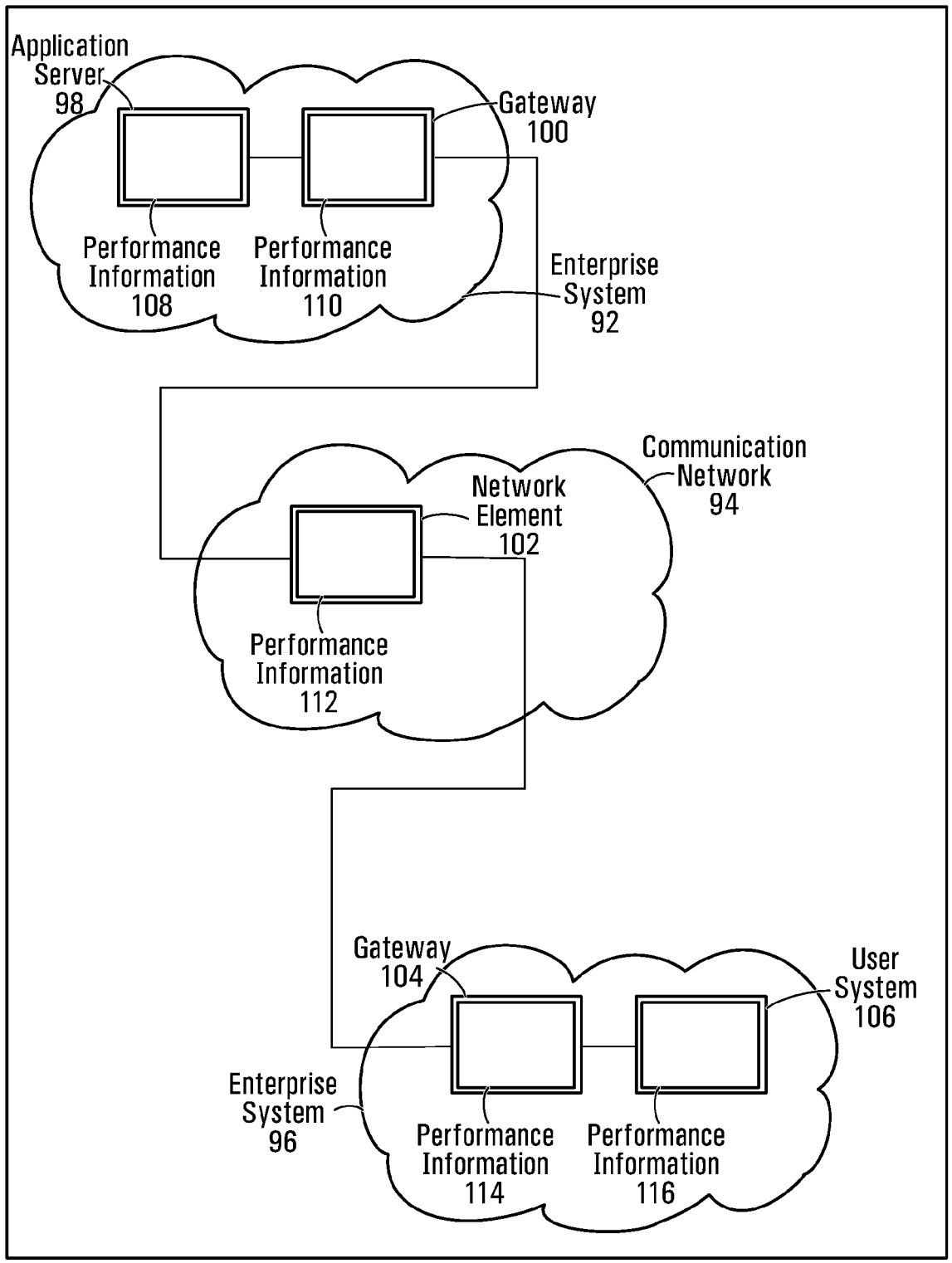
FIG. 5 is a block diagram of a GUI according to a further embodiment of the invention.

A GUI represents another form in which aspects of the present invention may be embodied. FIG. 5 is a block diagram of an example of such a GUI. The GUI 90 may be presented on a display device of an operator terminal, for example. With reference to FIG. 2, an administrator or operator might access performance information stored in the database 58 through a user system and a user system interface 52. The accessed information, or a processed version thereof, could then be presented on a display device at the user system.

The example GUI 90 includes representations 98, 100, 102, 104, 106 of service monitoring points along a network service transaction path. As shown, the service monitoring points are identified in the GUI 90 as network components at which service monitoring has been enabled. These service monitoring points might be identified in some other way in different implementations, using icons and/or network addresses for instance.

The transaction path shown in the GUI 90 includes multiple independently controlled networks, and representations of these networks, including two enterprise systems and an intermediate communication network, are also provided at 92, 94, 96.

Representations of performance information that is associated with a network service and has been collected at the service monitoring points are provided at 108, 110, 112, 114, 116. Performance information may be represented in any of various forms, such as text, numbers, plots, etc. A performance information representation might instead be a link or other active graphical element that can be selected to display performance information.

Where performance information meets alert conditions, an alert indication could also or instead be provided. In the event that requests are being delayed by more than a maximum delay time at the gateway represented at 100, for example, an alert indication could be provided by coloring the gateway representation 100 with an alert color, illustratively yellow or red.

Performance requirements such as baselines and/or SLA-based requirements could also be displayed in the GUI 90. This would provide an operator with an indication of the current status of a network service relative to the requirements for that service.

The GUI 90 is one illustrative example of a visual indication of network service performance that may be provided according to one embodiment of the invention. In other embodiments, further, fewer, or different graphical elements could be provided, in a similar or different layout than shown. For instance, an indication of the network service being viewed could be provided as part of the application server representation 98 or separately, as a screen title or within the performance information representations 108, 110, 112, 114, 116. A GUI might also include representations of other components, not necessarily only those at which service monitoring has been provided or enabled. Further variations may be or become apparent to those skilled in the art.

Embodiments of the invention may provide service monitoring and baselining to ensure that a published service conforms to requirements such as corporate standards and/or external SLAs. Network resident service monitoring allows multi-point sensing of service transaction performance, providing a real-time end-to-end view of performance and automatic establishment of current service baselines within an enterprise and across organizational boundaries.

This capacity may be useful to network and application administrators so as to provide assurance that services are performing as required, and to isolate network or application-level issues for troubleshooting. Current methods for monitoring network or application performance only support sensing at the point at which a service is published and isolated monitoring of IP packet flows en route. It is currently extremely difficult if not impossible for administrators to establish a complete view of actual performance experienced by a consumer of a service.

Automatic baseline generation can be used to provide a service operator with an easy-to-use method of detecting transient anomalies within their network. Real-time alerts can be generated when current performance levels drift or spike too far from the baseline value.

There are no available products today that allow service performance monitoring and automatic establishment of a performance baseline at various network nodes to ensure conformance to SLAs by providing a consolidated view of web service performance with alarms when performance is not within an SLA requirement.

Service performance monitoring and baselining as disclosed herein create a unique per-service end-to-end view of service availability, performance, and service performance baseline values. The view can be created per service for providers/consumers within an enterprise and/or for providers/consumers external to the enterprise, allowing network and application administrators to ensure service performance both within and across organizational boundaries.

The ability to ensure performance of services via real-time monitoring with alerts and consolidated per-service performance audit trails, even across organizational boundaries, is a powerful tool that is not currently available to administrators.

More generally, embodiments of the invention can be used to provide the complete functionality of a full service SOA infrastructure as follows:

Corporate Governance: provides monitoring, control and reporting to ensure compliance with regulations and supports continued corporate improvement;

Managed Partner Extranet: secured seamless publishing and consumption of web services with partners and branch locations;

Web Service Performance: ensures availability and performance of web services as per corporate requirements or Service Level Agreements (SLAs);

Corporate Agility & Application Sensitivity: provides application-level routing and message translation based on content of SOAP headers, XML tags, or other message content;

Application Security: provides application-level security by ensuring messages are well formed, detecting XML-based attacks and enforcing application data encryption policy;

Life Cycle Management: provides controlled publishing of web services with rollback;

System Features: provides reliability, scalability, and compliance with open standards.

These and other functions have been disclosed herein, and/or in one or more of the above-referenced related patent applications.

What has been described is merely illustrative of the application of principles of embodiments of the invention. Other arrangements and methods can be implemented by those skilled in the art without departing from the scope of the present invention.

For example, as noted above, the present invention is in no way limited to the particular divisions of functions, method steps, data structure contents, or GUI contents shown in the drawings and explicitly described above.

It should also be appreciated that the present invention is not limited to the above illustrative example of performance monitoring across different networks wherein a network service is provided by a service provider system in one communication network, such as the enterprise system 22 or the application system 26 (FIG. 1) and is being used by a network service consumer through an external and independently controlled communication network, such as the communication network 12, the enterprise system 24, and/or the remote user system installation 28. Although performance information collection at the different networks in this scenario would allow an administrator to maintain a record of inter-network performance of the network service, other applications of embodiments of the invention are contemplated.

Network service monitoring could potentially be applied to compare respective offerings of a type of network service by respective service provider systems in different communication networks. With reference to FIG. 1, suppose that a user system 49 in the remote user system installation 28 can access a specific type of service that is offered by respective application servers 32, 46 in the enterprise system 22 and the application system 26. A user of the user system 49 might wish to determine which service provider system, the application servers 32, 46 in this example, offers the best performance. In this case, performance information could be collected from both systems 22, 26, and a comparative determination of performance for the service can be made.

In addition, although described primarily in the context of methods and systems, other implementations of embodiments of the invention are also contemplated, illustratively as data structures or instructions stored on one or more machine-readable media, or as GUIs generated to display collected statistics and/or alerts, for example.

We claim:

1. A machine-implemented method comprising:
collecting, from a plurality of service monitoring points, performance information based on transaction data associated with a web service, the plurality of service monitoring points comprising a service monitoring point in a first communication network and a service monitoring point in a second communication network that is controlled independently of the first communication network;

maintaining a record of performance of the web service based on the performance information collected at the plurality of service monitoring points; and designating a primary intra-network collection point in each of the first communication network and the second communication network to collect performance information from multiple service monitoring points in each network, the collecting comprising collecting information from the designated primary intra-network collection points.

2. The method of claim 1, wherein the web service comprises respective different offerings of a type of web service by respective service provider systems in the first communication network and the second communication network.

3. The method of claim 1, wherein the web service is provided by a service provider system in the first communication network, wherein the second communication network comprises an external independently controlled communication network through which the web service is accessible by a web service consumer, and wherein the record comprises a record of inter-network performance of the web service.

4. The method of claim 3, further comprising:
comparing the record of performance to a performance requirement of the web service; and
generating an alert responsive to a difference between the record of performance and the performance requirement.

5. The method of claim 4, wherein the performance requirement reflects an active baseline requirement established based on previously collected performance information associated with the web service.

6. An apparatus comprising:
a performance information collection module that collects, from a plurality of service monitoring points, performance information based on transaction data associated with a web service, the plurality of service monitoring points comprising a service monitoring point in a first communication network and a service monitoring point in a second communication network that is controlled independently of the first communication network; and
a performance information processing module that is operatively coupled to the performance information collection module and maintains a record of performance of the web service based on the performance information collected at the plurality of service monitoring points, the performance information collection module comprising a designated primary intra-network collection point, in one of the first communication network and the second communication network, that collects performance information from multiple service monitoring points in the one of the communication networks and from a designated primary intra-network collection point in the other of the communication networks,
wherein at least one of the performance information collection module and the performance information processing module is implemented using hardware.

7. The apparatus of claim 6, wherein the web service comprises respective different offerings of a type of web service by respective service provider systems in the first communication network and the second communication network.

8. The apparatus of claim 6, wherein the web service is provided by a service provider system in the first communication network, wherein the second communication network comprises an external independently controlled communication network through which the web service is accessible by a web service consumer, and wherein the record comprises a record of inter-network performance of the web service.

9. The apparatus of claim 8, wherein the performance information processing module comprises an alert generator that compares the record of performance to a performance requirement of the web service, and generates an alert responsive to a difference between the record of performance and the performance requirement.

10. The apparatus of claim 9, wherein the performance requirement reflects an active baseline requirement established based on previously collected performance information associated with the web service.

11. The apparatus of claim 10, wherein the performance information processing module further comprises:
a baseline generator for generating the active baseline requirement based on previously collected performance information associated with the web service.

12. The apparatus of claim 6, the transaction data comprising data related to web service request and reply messages and the data comprising one or more of:
message size, message type, time received, internal processing time, and time sent.

13. A web services node comprising:
the apparatus of claim 6.

14. The web services node of claim 13, implemented at one or more of: the first communication network, the second communication network, and a central aggregation point.

15. An apparatus comprising:
a performance information collection module for collecting performance information based on transaction data associated with a web service at a service monitoring point, the service monitoring point comprising a service monitoring point in one of a first communication network and a second communication network that is controlled independently of the first communication network; and
an interface enabling the collected performance information to be forwarded to the other of the first communication network and the second communication network,
the performance information collection module comprising a designated primary intra-network collection point in the one of the first communication network and the second communication network, collecting performance information from multiple service monitoring points in the one of the communication networks, and forwarding the collected performance information to the other of the communication networks,
wherein at least one of the performance information collection module and the interface is implemented using hardware.

16. An apparatus comprising:
a memory for storing historical performance information that is based on transaction data associated with a web service and is collected from a plurality of service monitoring points, the plurality of service monitoring points comprising a designated primary intra-network collection point, in a first communication network, that collects performance information from multiple service monitoring points in the first communication network, and a designated primary intra-network collection point, in a second communication network that is controlled independently of the first communication network, that collects performance information from multiple service monitoring points in the second communication network; and
an alert generator that is operatively coupled to the memory and determines, based on the historical performance information, whether to generate an alert responsive to subsequently collected performance information associated with the web service.

17. The apparatus of claim 16, further comprising:
a baseline generator that is operatively coupled to the memory and to the alert generator and establishes a performance baseline based on the historical performance information,
wherein the alert generator determines whether to generate an alert by comparing the subsequently collected performance information to the performance baseline established by the baseline generator.

18. A Graphical User Interface (GUI) comprising:
respective representations of a plurality of service monitoring points, the plurality of service monitoring points comprising a designated primary intra-network collection point, in a first communication network, that collects performance information from multiple service monitoring points in the first communication network, and a designated primary intra-network collection point, in a second communication network that is controlled independently of the first communication network, that collects performance information from multiple service monitoring points in the second communication network; and
respective representations of performance information, based on transaction data associated with a web service, that has been collected at the plurality of service monitoring points.

* * * * *